UNITED STATES PATENT OFFICE.

FELIX MENDEL, OF ESSEN-ON-THE-RUHR, GERMANY.

THIOSINAMIN COMPOUND.

No. 868,204.     Specification of Letters Patent.     Patented Oct. 15, 1907.

Application filed December 9, 1905. Serial No. 291,075.

*To all whom it may concern:*

Be it known that I, FELIX MENDEL, a subject of the Emperor of Germany, and residing at Essen-on-the-Ruhr, Germany, have invented a new and useful Thiosinamin Compound, of which the following is a specification.

The object of my invention is the production of a pharmaceutical compound containing thiosinamin that may be used for subcutaneous injection with comparatively little pain or other disadvantages to the patient.

The statement is found in literature that thiosinamin is easily soluble in water. This general statement, however, is not true, for thiosinamin dissolves in large quantities only in hot water, and from this upon cooling it crystallizes out almost quantitatively, because it is very difficultly soluble in cold water. This insolubility in water renders its use for subcutaneous injection difficult, and on this account Hebra has suggested a 15% alcoholic solution. The injections with this latter solution are, however, so painful that long continued use, as is nearly always necessary, seems to be entirely precluded. The solution in warm water and glycerin as proposed by Juliusberg is more desirable. But even this, although causing less pain when injected, has the disadvantage of precipitation of thiosinamin after standing a short time, so that it is necessary to warm it for each new injection. Repeated warming is injurious to the thiosinamin, partly decomposing it, as evidenced by the strong alliaceous odor which is shown in solutions that have been warmed many times. On the other hand it has been said, especially by Lewandowsky, that the aqueous solution is less active than the alcoholic. I have discovered that these drawbacks are overcome if the thiosinamin is dissolved in an aqueous solution of sodium salicylate. In this it is unusually easily soluble, and yields a very stable preparation which is injected without pain. In addition, it meets in every way the requirements of practice. Furthermore, the sodium salicylate has the effect of relieving the pain, so that its use has a twofold advantage. The solutions prepared in this way may be marketed sterilized in sealed glass tubes.

I give the following examples of the process by which my new product may be made:

Example 1.—One molecule thiosinamin (11.5 kgr., and one half molecule sodium salicylate (8 kgr.) are dissolved in water, alcohol, or the like and evaporated. The residue left is a white crystalline powder which is very easily soluble even in cold water. If water is used as a solvent, concentrated solutions may be directly prepared.

Example 2.—A mixture containing one molecule thiosinamin (11.5 kgr.) to one molecule of sodium salicylate (16 kgr.) gives also the same results.

My new compound when solid forms a crystalline powder. Its solution shows with ferric chlorid the characteristic reaction of sodium salicylate and when the solution is boiled the smell of allyl mustard oil is given off.

The solution of thiosinamin in sodium salicylate may be indicated in all cicatricial conditions of the skin and the interior organs, no matter what is the cause of the scar. It is contraindicated only in cases, in which there is a danger of aggravating inflammatory processes. It is the best to carry out injections of the solution followed by massage and active and passive movements.

Having thus described my invention, I claim as new and desire to secure by Letters Patent:

1. A compound containing thiosinamin and a salicylate.
2. As an article of manufacture a solution of thiosinamin in a solution of a salicylate.
3. As an article of manufacture, a solution of thiosinamin in a solution of sodium salicylate.
4. As an article of manufacture, a solution of thiosinamin in an aqueous solution of sodium salicylate.
5. As an article of manufacture, a solution of one molecule of thiosinamin in an aqueous solution of at least one half molecule of sodium salicylate.

In witness whereof I have hereunto signed my name in the presence of two subscribing witnesses.

FELIX MENDEL.

Witnesses:
    ERNEST BRODRÉ,
    PETER LIEBER.